Figure 1:
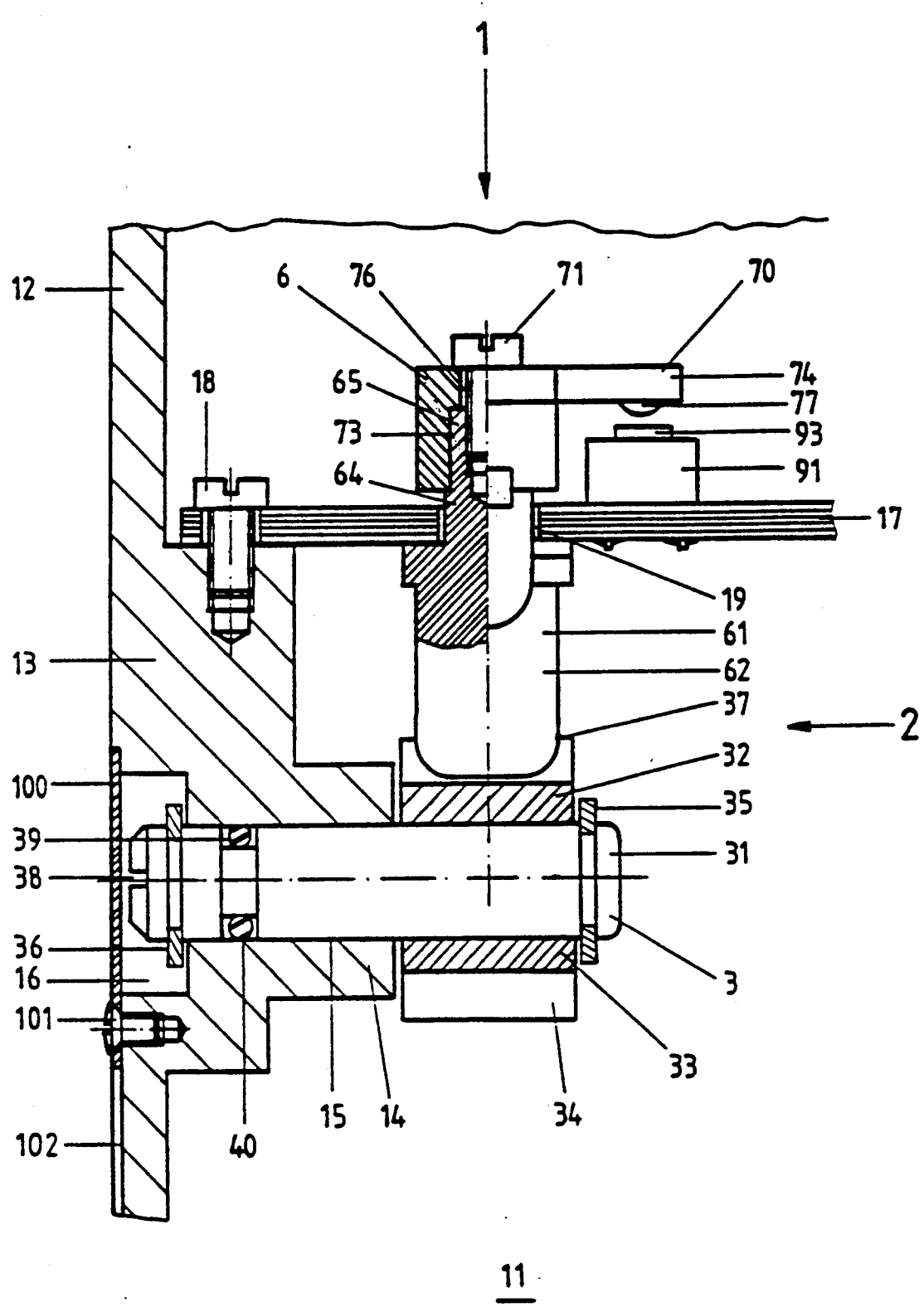

United States Patent [19]
Maier et al.

[11] Patent Number: 5,237,851
[45] Date of Patent: Aug. 24, 1993

[54] DEVICE FOR THE ANALOG ACTUATION OF A DIGITAL SETTING OPERATION

[75] Inventors: Winfried Maier, Maulburg; Elmar Pfuendlin, Lörrach, both of Fed. Rep. of Germany

[73] Assignee: Endress u. Hauser GmbH u. Co., Maulburg, Fed. Rep. of Germany

[21] Appl. No.: 687,900

[22] PCT Filed: Oct. 4, 1990

[86] PCT No.: PCT/DE90/00755
§ 371 Date: May 31, 1991
§ 102(e) Date: May 31, 1991

[87] PCT Pub. No.: WO91/05223
PCT Pub. Date: Apr. 18, 1991

[30] Foreign Application Priority Data
Oct. 6, 1989 [DE] Fed. Rep. of Germany ....... 3933381

[51] Int. Cl.⁵ ............................................. G01P 21/02
[52] U.S. Cl. ...................................................... 73/1 R
[58] Field of Search ................................ 73/1 R–4 V; 364/571.01

[56] References Cited

U.S. PATENT DOCUMENTS

| | | | |
|---|---|---|---|
| 1,658,055 | 2/1928 | Lillyquist | 73/2 |
| 4,408,896 | 10/1983 | Ikegami | |
| 4,920,784 | 5/1990 | Gonsior | 73/1 E |
| 4,947,674 | 8/1990 | Strain et al. | 73/1 D |
| 5,008,843 | 4/1991 | Poelsler et al. | |

FOREIGN PATENT DOCUMENTS

| | | |
|---|---|---|
| 0324067 | 7/1989 | European Pat. Off. . |
| 2758856 | 7/1979 | Fed. Rep. of Germany . |
| 0057111 | 4/1984 | Japan ..................................... 73/1 J |

OTHER PUBLICATIONS

"Instrument Housing Type V", Operating Manual, Endress + Hauser, pp. 1-6, date unknown.
"Measuring and Control Instrument for pH and Redox potential", Endress + Hauser, pp. 1-4, date unknown.

Primary Examiner—Robert Raevis
Attorney, Agent, or Firm—Barnes & Thornburg

[57] ABSTRACT

Proposed is a device for the analog actuation of a digital setting process, specifically the setting and/or calibration of transducers equipped with microprocessors, with a setting shaft extending through the outside wall of a housing in the interior of which the electrical/electronic components of the transducer are located. The device is formed by a first, analog component and a second, digital component which is in nonpositive connection with the first component. The rotary movement of the first component pivots a cam which is firmly connected with it against the paddle of a rocker switch, causing the paddle to deflect. Associated with the deflection, the rocker motion of the rocker switch about the fulcrum causes a boss arranged on the rocker switch to engage the push button of a push-button switch arranged on a printed circuit board, to switch the push-button switch and to close or open a circuit necessary for setting and/or calibration.

37 Claims, 2 Drawing Sheets

DEVICE FOR THE ANALOG ACTUATION OF A DIGITAL SETTING OPERATION

The invention concerns a device for the analog actuation of a digital setting operation, specifically the setting and/or calibration of transducers equipped with microprocessors, with a setting shaft extending through the outside wall of a housing in the interior of which the electrical/electronic components of the transducer are contained, and with at least one electrical circuitry element arranged on the printed circuit board.

Such setting operations are necessary specifically for transducers serving to determine physical and/or chemical values of a process, to convert these to an electrical signal and transfer them to an evaluation unit or an information processing center. For instance, such transducers are used to determine the pressure, to fill level, temperature, moisture, amount of flowing bulk or of a liquid, the ion equilibrium state (Redox potential) or similar physical and/or chemical variables that occur during a process. For that purpose, the transducers are connected with a line through which the electrical signals are transmitted to the evaluation unit or to the information processing center, and through which also the electrical energy necessary for the functioning of the transducer is transmitted from the evaluation unit or the information processing center to the transducer.

The monitoring of complex process operations very often makes it necessary to arrange also the evaluation unit in the immediate vicinity of the process whose physical and/or chemical values are to be monitored. This has the disadvantage that the electronic component of the transducer and also the evaluation unit, mostly arranged outside the wall surrounding the medium being measured, are exposed to explosive or aggressive or other atmospheres which have an effect on their operability.

Therefore, it is necessary that both the electronic part of the transducer and the evaluation unit are surrounded by a wall providing a partition as against the explosive or aggressive atmosphere.

On the other hand it is necessary to adjust the transducers at the site of usage to the measuring range corresponding to the conditions of use and to calibrate them, i.e., to adjust the zero point according to the test normals. The setting devices needed for that purpose are contained in the electronic part of the transducer. Heretofore this was an analog operation characterized mostly by the adjustment of spindle type or variable resistors. The introduction of modern microelectronics in the electronic circuits of the transducers associated with the use of microprocessors allows the digital adjustment and calibration, for instance by changing the counting pulses.

The presently customary electronic communication between transducer and evaluation unit also makes it possible to perform the setting and calibration of the transducer from the evaluation unit. To that end, naturally, the devices required for that purpose are accommodated in the evaluation unit.

Previously known from the German patent document 27 58 856 is a transducer, specifically for direct-measuring operational analysis instruments with an actuator device serving the calibration, within a housing where the housing wall consists of nonmagnetic material where a permanent magnet is connected with the actuator device and features an outer permanent magnet fashioned as an outer entrainment magnet, which permanent magnet can be set on the housing wall, where a rotation of the entrainment system causes the entrainment of the inner magnet and, thus, the actuation of an analog actuator device, without any bore extending through the nonmagnetic housing wall.

The problem underlying the invention is to propose a device for the analog actuation of a digital setting operation, specifically the setting of transducers equipped with microprocessors, where the actuation of the setting operation may be performed from outside through a simple rotary movement of a setting means extending through the wall that separates the electrical/electronic setting components from the explosive or aggressive atmosphere, the device consisting of only few parts, requiring for its assembly and replacement of the printed circuit board no adjustment and being protected against inadvertent resetting of the parameters.

This problem is solved through the features characterized in the patent claims.

Furthermore, the inventional device offers the advantage that the person entrusted with the setting can actuate the digital setting of the parameters, as usual, through an analog actuation.

A favorable design and development of the invention are set forth in the subclaims. Additional advantages and characteristics of the invention derive from the following description of an embodiment illustrated in the drawing.

Figure 2:
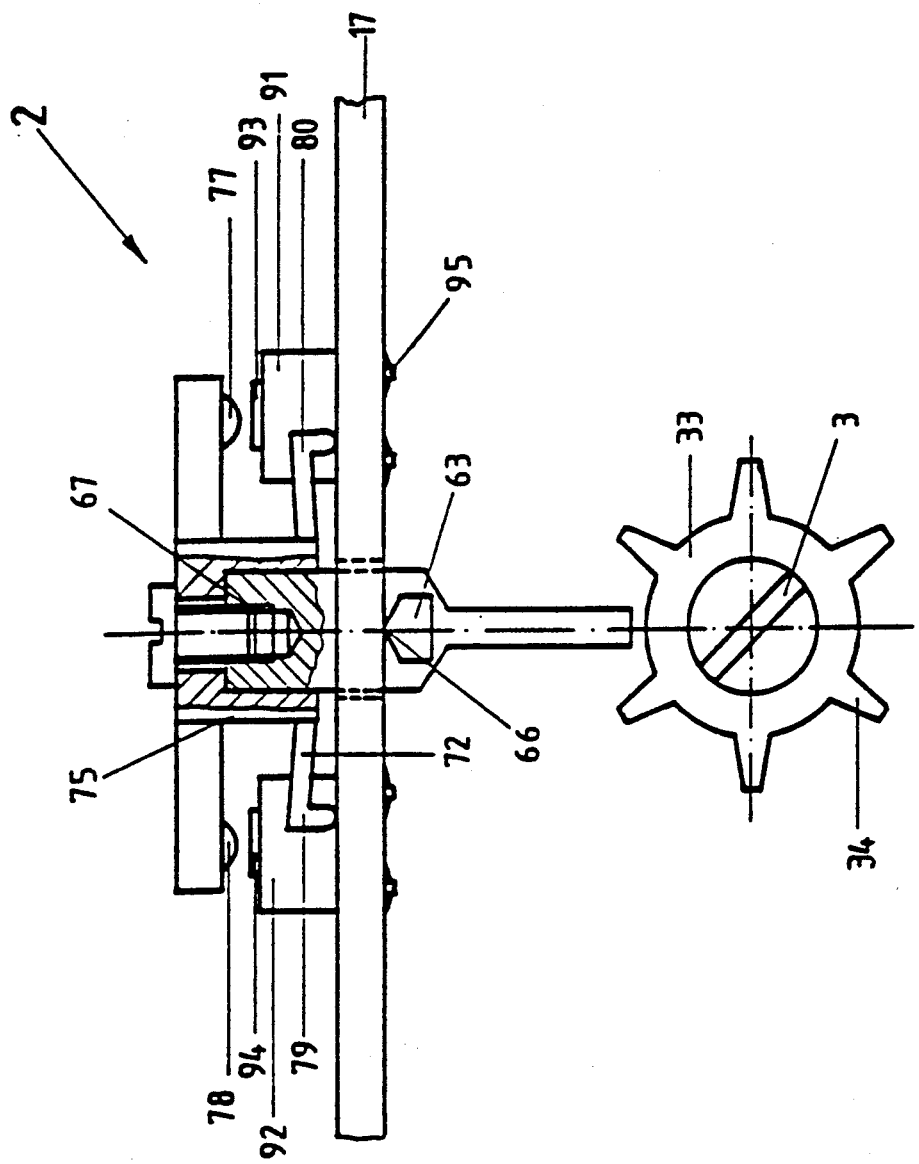

FIG. 1 shows a sectional side elevation of the invention in built-in condition;

FIG. 2, a schematic illustration of the inventional device relative to FIG. 1 as a front elevation.

Illustrated in FIG. 1 is the housing section of a transducer whose parameters are to be adjusted and/or calibrated with the inventional device 2. In those cases where the adjustment and/or calibration can be effected from the evaluation unit, naturally, there is a section of such an evaluation unit concerned. For the sake of better explanation, however, the described embodiment will be based on the direct setting and/or calibration of a transducer.

The device 2 is arranged in the interior 11 of the transducer 1. It comprises the shaft 3, rocker switch 6 and push-button switches 91, 92. The interior 11 of the transducer 1, by which the electrical/electronic parts of the transducer are separated from the explosive or aggressive atmosphere, is surrounded by the housing wall 12. Molded to the housing wall is a region of stepwise increased wall thickness 13 and the bushing 14. Within the region of increased wall thickness 13 and the bushing 14, a cylindrical bore 15 extends through the housing wall 12. On the outside of the housing wall 12 the cylindrical bore 15 expands to a cylindrical opening 16 of larger diameter. The cylindrical opening 16 extends some distance in the axial direction of the cylindrical bore 15 and assumes in relation to the bore 15 a position such that its axis of symmetry coincides with that of the bore 15. A shaft 31 is rotatably mounted in the bore 15. The shaft 15 may be manufactured by a cutting process, from metal, preferably stainless and acid-resistant steel. The shaft 31 assumes in the housing wall 12 a position such that on the side facing the housing outside it will protrude some distance into the cylindrical opening 16 of the housing wall 12. The bearing seat between the cylindrical bore 15 and shaft 31 is so designed that both parts have relative to each other a smooth running fit.

For using electrical apparatuses in an explosive atmosphere it is necessary to separate all conductive parts spatially from the explosive atmosphere. Required conduits through the separating wall should be so designed that a minimum gap length of 12.5 mm and a maximum gap with of 80 μm is assured. The molded stepwise reinforcement 13 of the housing wall 12 results in conjunction with the additionally molded bushing 14 in a gap length of the conduit formed by the bore 15 and shaft 31 of more than 12.5 mm, and the smooth running fit forms a ring-shaped gap which ranges below the admissible maximum gap width of 80 μm, so that transducers equipped with the device 2 can readily be used within an explosive atmosphere.

On the near side of the housing interior 11, a cam plate 32 is non-positively connected with the shaft 31, by means of a press fit. The cam plate 32 is made of thermoplastic material characterized by great hardness, rigidity and temperature resistance, preferably from a polyoxymethylene in a molding process. The press fit between shaft 31 and cam plate 32 may also be brought about in such a way that the cam plate 32 is molded to the shaft 31 during the molding operation. The cam plate 32 consists of the hub 33 and the radially extending cams 34. The cams 34 are so arranged on the shell surface of the hub 33 that their axes of symmetry have at the circumference of a circle that coincides with the shell surface of the hub 33 an even spacing from one another and that always two cams 34 are diametrically opposed (FIG. 2). The cams 34 have a trapezoidal cross section and taper evenly in the direction away from the shell surface of the hub 33. The hub 33 and the cams 34 are of equal width. The radially extending lengths of the cams 34 have been so selected that the top edge 37 will assume a position in which cams 34 and rocker levers 61, of the rocker switch 6, will overlap by at least ⅔ of the length of the cams 34.

The shaft 3 features two equal shaft retaining rings 35 and 36 that are inserted in grooves which on both ends of the shaft 31 sink into its shell surface. The shaft retaining rings 35 and 36 secure the position of the shaft 3 in the housing wall 12 against inadvertent loosening. On the side facing to the exterior of the housing, the shaft 31 features a groove 38 which diametrically extends across the end face. It is so dimensioned that it is suited to receive the blade of a screwdriver. The nut serves to actuate the setting and/or calibration process, which will be addressed yet later on. A short distance from its outer end, the shaft 31 has another groove 39 molded to it; it serves to receive a ring-shaped seal 40, which may be formed by a commercially available O-ring and additionally seals the housing interior 11 from the surroundings.

Also arranged in the interior 11 of the transducer 1 is the printed circuit board 17, fastened to the housing wall 12 by means of a screw connection 18. Mounted on the printed circuit board 17 are the electronic components, not illustrated, that form the electrical circuit of the transducer 1. They interconnect electrically with one another by not illustrated lines. Also arranged on the printed circuit board 17 is the as well not illustrated microprocessor, through the program of which the transducer is to be digitally set and/or calibrated. Also arranged on the printed circuit board 17 is the rocker switch 6. It consists of the rocker lever 61, the switching lever 70 and the screw 71. The rocker lever 61 and the switching lever 70 are coupled together by a screw 71. Molded to the rocker lever 61 is a paddle 62. The position of the rocker switch 6 on the printed circuit board 17 is so selected that the paddle 62 will transverse to its width at any rate assume a position situated between two adjacent cams 34 and lengthwise to its width within the width of the cam plate 32 while extending parallel to the cams 34.

The rocker lever 61, moreover, comprises the rocker bearing 63 (FIG. 2), the intermediate section 64 and the square pin 65. The paddle 62 has a rectangular cross section and a width amounting to about 5 times its thickness. The length of the paddle 62, in turn, is so selected that the paddle overlaps the cams 34 by at least ⅓ of the cam length. For fastening the rocker switch 6 on the printed circuit board 17, the latter features a cylindrical through-bore 19 through which extends the adapter 64. The latter has a cylindrical cross section, and its diameter is about 1 mm smaller than the diameter of the cylindrical bore 19. As a result, the rocker switch 6 can be easily deflected on the printed circuit board 17.

The rocker bearing 63 molded to the rocker lever 61 extends diametrically from the adapter 64 in the direction of the width of the paddle 62 and protrudes on both sides some distance beyond the width of the paddle 62. On its near side of the printed circuit board 17 there are molded to the rocker bearing 63 two surfaces that are arranged relative to each other at an angle of 60° while extending across the entire width of the rocker bearing 63. The knife edge 66 between the two surfaces forms the fulcrum and, together with the printed circuit board 17, the pivotal point of the rocker switch 6. The knife edge 66 bears against the effect of a reset spring 72 (FIG. 2) on the surface of the printed circuit board 17 facing toward the shaft 3. On the side away from the paddle 62, a square pin 65 is additionally molded to the rocker lever 61. Said pin extends through a recess 73 in the switching lever 70.

The switching lever 70 is comprised of the lever 74 and the integrally molded bushing 75. The latter extends in the axial direction of the rocker lever 61 in such a way that the axis of symmetry of rocker lever 61 and bushing 75 will coincide. The recess 73 formed in the interior of the bushing 75, the same as the square pin 65, has a quadratic cross section. The recess 73 extends coaxially with the axis of symmetry of the bushing 75, extending through the bushing almost to the level of the lever 74. The area of the bushing 75 through which the recess 73 does not extend features a bore 76 for the screw 71. The square pin 65, in turn, now is provided with the threaded bore 67 (FIG. 2) and enters with the screw 71 in a screw connection by which the rocker lever 61 and the switching lever 70 are firmly connected with each other by formfit. A collar molded to the adapter 64 of the rocker lever 61 serves to fix the position of both parts relative to each other. The square fit of the square pin 65 and the equally shaped recess 73 form a tongue and groove joint, fixing the relative position of the two parts and securing them against rotation.

Bushing 75 is formed integrally with switching lever 74. Switching lever 74 extends tangentially away from bushing 75. The longitudinal axis of bushing 75 is perpendicular to the longitudinal axis of lever 74.

On its side facing toward the printed circuit board 17, rounded bosses 77, 78 are molded to the lever 74 in the vicinity of its two ends.

Diametrically arranged, the two shanks 79, 80 of the reset spring 72 extend additionally on the side of the bushing 75 facing toward the printed circuit board 17. The two shanks 79, 80 extend generally perpendicularly to the longitudinal axis of the bushing 75. In the neutral position, illustrated schematically in FIG. 2, the lever 74 and the two shanks 79, 80 of the reset spring 72 extend approximately parallel to the surface of the printed circuit board 17. This is the case because the two ends of the spring shanks 79, 80 form relative to the longitudinal axis of their shanks an angle of 90°. The short, angled sections bear on the surface of the printed circuit board 17, whereby the rocker switch 6 assumes the illustrated neutral state. The rocker lever 61 and the switching lever 70, the same as the cam plate 32, are made of a thermoplastic material characterized by great hardness, rigidity and thermal resistance, preferably by a molding process using a polyoxymethylene.

Furthermore, two push-button switches 91, 92 of customary design are so arranged on the printed circuit board 17 that their push buttons 93, 94 assume a position directly opposite the rounded push bosses 77, 78 of the rocker switch 6. On their near side of the printed circuit board 17, the push-button switches 91, 92 feature soldering tabs 94 which by means of bores pass through the printed circuit board 17 and are on the underside of the printed circuit board 17 electrically connected, by soldering, with the not illustrated printed lines.

The printed lines and the soldering tabs represent sections of an electrical circuit which by means of the push-button switches 91, 92 can be closed or opened. Each of the two push-button switches 91, 92 is electrically so connected with the printed lines that its switching movement will close or open a separate circuit.

In the schematic illustration of the invention shown in FIG. 2, the front panel 12 was completely omitted for the sake of better representation. The mode of operation of the inventional device shall now be described in greater detail with the aid of FIG. 1 and the schematic illustration of FIG. 2. For setting and/or calibrating the transducer 1, the operator so entrusted loosens first the screw 101 and extends through the cover 100 and screws into the wall 12. The cover 100 and screw 101 close the cylindrical opening 16 in relation to the environment, preventing the inadvertent or also unauthorized actuation of a setting operation. Following the loosening of the screw 101, the cover 100 can be shifted along the groove 102 in such a way that the cylindrical opening 16 will be exposed and the shaft 3 accessible to the operator.

A rotary motion of several degrees about the longitudinal axis of the shaft 3, for instance clockwise, performed by the operator by means of a screw-driver, causes a pivoting movement of the cams 34 of the cam plate 32 which is firmly connected with the shaft 31, in the drawing plane of FIG. 2. The rotary movement of the shaft 3 can be continued until one of the cams 34 makes contact with the paddle 62 of the rocker lever 61. As the rotary movement of the shaft 3 is now carried further, the cam 34 entrains the paddle 62, pivoting the rocker lever 61, against the effect of the reset spring 72, toward the right about the fulcrum 66. It is readily evident that the rocking motion of the rocker lever 61 triggered by the rotary motion of the shaft 3, toward the right in the drawing plane of FIG. 2, about the fulcrum 66 will lead to a rocker movement of that part of the rocker lever 61 that is situated above the fulcrum 66 and of the lever 74 which by formfit is connected with the rocker lever 61, to the left. At the same time, the lever 74 thus changes its neutral position parallel to the surface of the printed circuit board 17, to the effect that the boss 78 is forced on the push button 94 of the push-button switch 92, thereby actuating the push-button switch. This closes the circuit. The simultaneous raising of the other end of the lever 74 along with the boss 77 prevents the two push-button switches 91, 92 from being actuated simultaneously. Consequently, a rotary movement of the shaft 3 to the left causes the actuation of the push-button switch 91 and, thus, the closing of another circuit. Since the rocker motion of the rocker lever 61 also causes the shank 79 or 80 of the reset spring 72, depending on the direction of the rocking motion, to be deformed against its spring effect, the state of equilibrium of the rocker switch 6 will restore again as the pressure on the rocker lever 61 relents. That is, the boss which has engaged the push-button switch swivels now away from the switch and initiates thereby a switching operation by which the respective circuit is again interrupted. The closing or opening of the circuit by rotation of the shaft 3 can now be utilized for actuating the digital setting and/or calibration of the transducer 1 by means of electrical individual pulses or the actuation of a setting cycle stored in the microprocessor. In the illustrated embodiment, the push-button switches 91 and/or 92 close circuits that cause the digital values of a value stored in the microprocessor to be incremented or decremented, so that in contingence on the direction of rotation of the shaft 3 the digital value of memory can be incremented or decremented.

As can be seen from the schematic illustration in FIG. 2, actuating the setting process requires only two cams 34 of the cam plate 32, for pivoting the rocker lever 61. The arrangement of additional cams 34, distributed evenly across the circumference of the hub 33, offers the advantage though that an adjustment of cam plate 32 and rocker lever 61 can be dispensed with when installing the printed circuit board 17 or after its replacement, since the paddle 62 of the rocker lever 61 assumes at any rate a position between two adjacent cams 34. An additional advantage is constituted in that an inadvertent slippage of the paddle 62 across the top edge 37 of the cam 34, due to improper operation, will again cause the paddle 62 to assume a position between two adjacent cams 34, so that the setting and/or calibration process can readily be continued in either direction.

We claim:

1. Device for the analog actuation of a digital setting process for setting and/or calibration of transducers equipped with microprocessors, with a shaft extending through the outside wall of a housing in the interior of which the electrical/electronic components for the adjustment and/or calibration of the transducer are located, the device comprising:
   a) an analog component (3) and a digital component (6);
   b) means for coupling the analog component (3) to the digital component (6) in such a way that a rotary movement of the analog component (3), performed outside the housing wall (12), will cause a rocker movement of the digital component (6) arranged in the interior of the housing (1) on a printed circuit board (17), and that thereby, through actuation of at least one push-button switch (91), at least one circuit is closed or opened for setting and/or calibration of the transducer (1).

2. Device according to claim 1, characterized in that the analog component comprises a shaft (31), a cam plate (32) coupled to the shaft (31), and in that said analog component is installed in the wall (12) of the housing (1) in a fashion allowing its rotation about its longitudinal axis.

3. Device according to claim 2, characterized in that the cam plate (32) consists of a thermoplastic material and is preferably made from a polyoxymethylene by an injection-molding process.

4. Device according to claim 2, characterized in that the shaft (31) consists of metal.

5. Device according to claim 4, characterized in that the shaft (31) features on its side away from the housing interior (11) means (38) for actuation of the setting or calibration process.

6. Device according to claim 2, characterized in that the fit between the shaft (31) and the housing wall (12) is a smooth running fit.

7. Device according to claim 2, characterized in that the fit between the shaft (31) and the housing wall (12) is fashioned as a safety against flame penetration.

8. Device according to claim 7, characterized in that the cam plate (32) features at least two cams (34) which, spaced from each other, are arranged on the circumference of the hub (33) of the cam plate (32), extending radially from the hub (33) of the cam plate (32).

9. Device according to claim 8, characterized in that the cams (34) have a trapezoidal cross section and a length such that they will be overlapped by ¾ of their length by a paddle (61) of the digital component (6).

10. Device according to claim 2, characterized in that the cam plate (32) is press fit on a side of the shaft (31) facing toward the housing interior (11).

11. Device according to claim 1, characterized in that the second, digital component comprises a rocker switch (6) arranged in the interior (11) of the housing (1) on the printed circuit board (17).

12. Device according to claim 11, characterized in that the rocker switch (6) comprises a rocker lever (61) and a switching lever (70), in that the rocker lever (61) and the switching lever (70) are in formfit connection with each other by means of a tongue and groove joint (65), (73) fashioned as a screw connection (67), (71), and in that it is arranged in a fashion rockable about a common fulcrum (66) on the printed circuit board (17).

13. Device according to claim 12, characterized in that the rocker lever comprises a paddle (62), a rocker bearing (63), a cylindrical adapter (64) and a square pin (65), in that the cylindrical adapter (64) extends through a bore (19) in the printed circuit board (17) in such a way that the rocker bearing (63) bears on the printed circuit board (17) against the effect of a reset spring (72).

14. Device according to claim 13, characterized in that the paddle (62) of the rocker lever (61) has a rectangular cross section and length such that its end facing toward a cam plate (32) is overlapped by at least ¾ of the length of at least two cams (34).

15. Device according to claim 13, characterized in that the rocker bearing (63) molded to the rocker lever (61) extends somewhat beyond the width of the paddle (62).

16. Device according to claim 12, characterized in that the switching lever (70) comprises a lever (74), a bushing (75), a reset spring (72), the bushing being formed to include a recess (73) having a rectangularly shaped cross section.

17. Device according to claim 16, characterized in that the switching lever (70) features a lever arm (71) which tangentially extends from the bushing (75) and features on both of its ends bosses (77), (78).

18. Device according to claim 17, characterized in that the reset spring (72) extends diametrically on both sides of the bushing (75), the reset spring including two shanks (79), (80) which are bent over on their ends at a right angle, the reset spring (72) bearing with its angled ends on the surface of the printed circuit board 17 against its spring effect.

19. Device according to one of the claim 11, characterized in that the parts rocker lever (61) and switching lever (70) forming the rocker switch (6) are made of a thermoplastic material.

20. Device according to claim 1, characterized in that push-button switches (91), (92) are so arranged on the printed circuit board (17) that their push buttons (93), (94) and a pair of bosses (77), (78) of the switching lever (70) are situated opposite one another.

21. Device according to claim 1, characterized in that a pair of push-button switches (91), (92), together with the soldering tabs (94) and printed lines are arranged on the printed circuit board (17).

22. Device according to claim 1, characterized in that the longitudinal axes of a setting shaft (3) and a rocker switch (6) form together an angle of 90°.

23. Device according to claim 1, characterized in that a paddle (62) assumes a position between a pair of cams (34).

24. Device according to claim 1, characterized in that the rotary movement of a setting shaft (3) advances a cam (34) of a cam plate (32) against a paddle (62) of a rocker switch (6), causes the paddle (62) to deflect, causes the rocker motion of the rocker switch (6) about a fulcrum (66), causes a boss (77) of the rocker switch (6) to engage a push button (93) of a push-button switch (91) arranged on the printed circuit board (17), causes the push-button switch (91) to switch and to close or open a circuit required for setting and/or calibration.

25. Device according to claim 1, characterized in that the housing (12) features means (16), (100), (101), (102) which prevent an unauthorized or unintended actuation of the setting or calibration process.

26. Device according to claim 25, characterized in that the means (16), (100), (101), (102) for prevention of the unauthorized or unintended actuation of the setting operation can be detached from the housing wall (12) or are movable on it.

27. An apparatus to actuate means for calibrating a transducer where the calibrating means is coupled to a printed circuit board located in an interior of a housing, the apparatus comprising:
a rocker switch coupled to the printed circuit board, the rocker switch being movable from a first neutral position to a second position for actuating the calibrating means;
a shaft coupled to the housing for rotation about its longitudinal axis; and
means coupled to the shaft for deflecting the rocker switch from the first neutral position to the second position in response to rotation of the shaft about its longitudinal axis to actuate the calibrating means, thereby calibrating the transducer.

28. The apparatus of claim 27, wherein the deflecting means includes a cam plate coupled to the shaft, the cam plate including at least two cams located in a spaced apart relation from each other.

29. The apparatus of claim 28, wherein the at least two cams are arranged on the circumference of a hub of the cam plate, the at least two cams extending radially outwardly from the hub of the cam plate.

30. The apparatus of claim 27, wherein the rocker switch includes a rocker lever, a rocker bearing coupled to the rocker lever, and a switching lever coupled to the rocker lever for engaging the calibrating means.

31. The apparatus of claim 27, further comprising a reset spring coupled to the rocker switch for returning the rocker switch to its first neutral position after actuation of the calibrating means.

32. The apparatus of claim 27, wherein the calibrating means includes at least one push button switch.

33. An apparatus for calibrating a transducer, the apparatus comprising:
a housing having an interior region;
a printed circuit board located in the interior of the housing;
first and second push button switches coupled to the printed circuit board for calibrating the transducer;
a rocker switch coupled to the printed circuit board, the rocker switch being selectively movable from a first neutral position to a second position for actuating the first push button switch and from the first neutral position to a third position for actuating the second push button switch;
means coupled to the housing for deflecting the rocker switch from the first neutral position selectively to the second position or the third position to actuate the first and second push button switches, respectively, thereby calibrating the transducer.

34. The apparatus of claim 33, wherein the deflecting means includes a shaft and a cam plate coupled to the shaft, the cam plate including first and second cams located in a spaced apart relation from each other for deflecting the rocker switch from the first neutral position selectively to either the second position or the third position, respectively, in response to rotation of the shaft about its longitudinal axis.

35. The apparatus of claim 34, wherein the first and second cams are arranged on the circumference of a hub of the cam plate, the first and second cams extending radially outwardly from the hub of the cam.

36. The apparatus of claim 33, wherein the rocker switch includes a rocker lever, a rocker bearing coupled to the rocker lever, and a switching lever coupled to the rocker lever, the switching lever including first and second bosses for engaging the first and second push button switches.

37. The apparatus of claim 33, further comprising first and second reset springs coupled to the rocker switch for returning the rocker switch to its first neutral position after actuation of the first and second push button switches, respectively.

* * * * *